United States Patent [19]

Fujiwara

[11] 4,222,689
[45] Sep. 16, 1980

[54] DRILLING AND TAPPING SCREW

[75] Inventor: Isamu Fujiwara, Higashi-Osaka, Japan

[73] Assignee: Fujibyora Co., Ltd., Higashi-Osaka, Japan

[21] Appl. No.: 945,777

[22] Filed: Sep. 26, 1978

[30] Foreign Application Priority Data

Feb. 20, 1978 [JP] Japan ............................. 53-21253[U]

[51] Int. Cl.² ........................ F16B 25/00; F16B 35/04
[52] U.S. Cl. ........................................ 85/41; 408/227
[58] Field of Search ............... 85/41, 47, 46; 408/227, 408/228, 229, 230, 226, 224

[56] References Cited

U.S. PATENT DOCUMENTS

| | | | |
|---|---|---|---|
| 3,395,603 | 8/1968 | Skierski | 85/47 |
| 3,463,045 | 8/1969 | Prescott | 85/41 |
| 3,699,841 | 10/1972 | Lanius | 85/41 |
| 3,786,713 | 1/1974 | Sygnator | 85/47 X |
| 3,861,269 | 1/1975 | Laverty | 85/46 |
| 4,028,987 | 6/1977 | Wilson | 85/46 |

Primary Examiner—Ramon S. Britts
Attorney, Agent, or Firm—Armstrong, Nikaido, Marmelstein & Kubovcik

[57] ABSTRACT

A screw having drilling, tapping and fastening functions at the same time comprises a slender shank having a tool receiving head formed at the rear end of the shank, a drill portion integral with the front end of the shank and a helical cutting screw thread on the outer periphery of the shank. The drill portion is flat or plate-like in cross section and is tapered toward its tip to provide a pair of sharp drilling edges. A pair of ribs extending longitudinally of the shank are formed on the opposite long side portions of the drill portion in symmetrical arrangement. The ribs prevent break of the drill portion during cutting while permitting smooth removal of chips.

3 Claims, 8 Drawing Figures

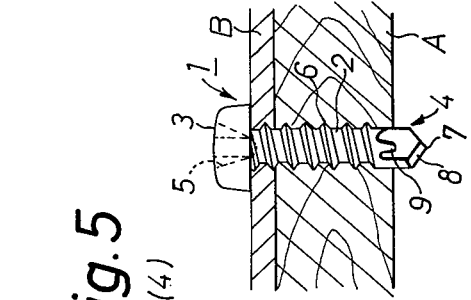
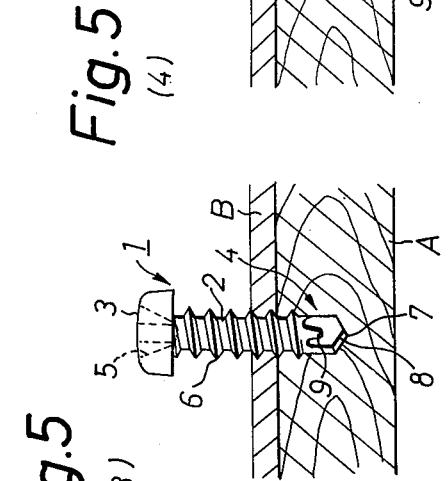
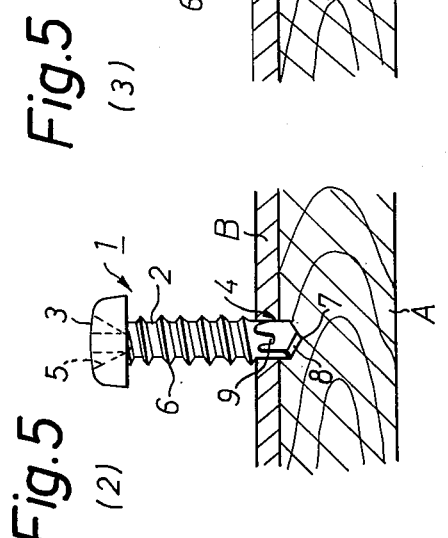
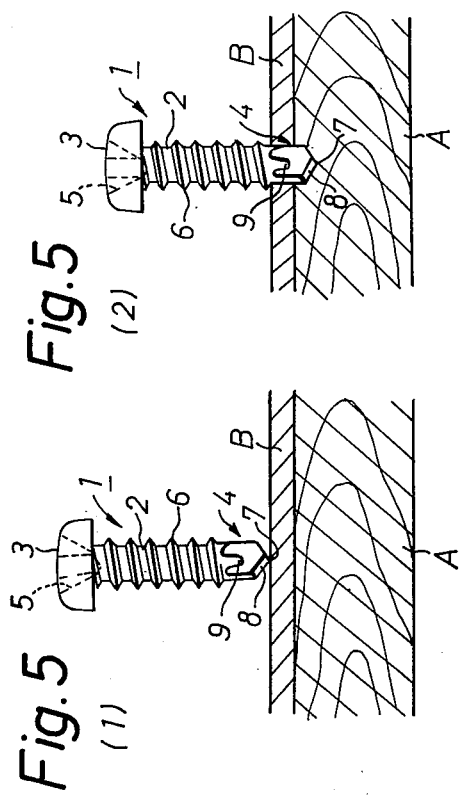
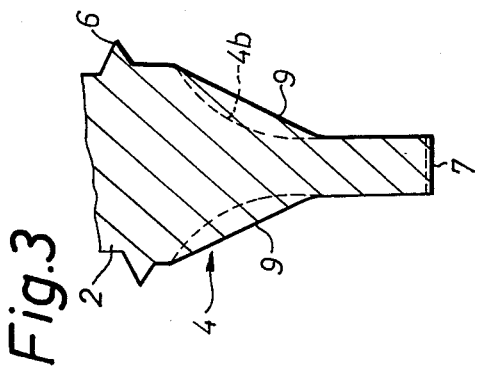
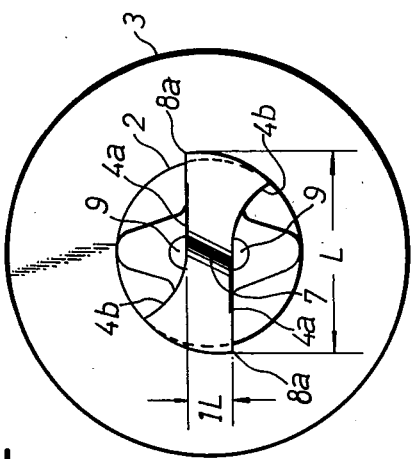

DRILLING AND TAPPING SCREW

BACKGROUND OF THE INVENTION

The present invention relates to screws of novel construction, and more particularly to novel drilling and tapping screws.

Self-drilling and -tapping screws having drilling, tapping and fastening functions are widely used for assembling parts with ease and economically. In fact, various screws of this type have heretofore been proposed as disclosed in U.S. Pat. No. 3,463,045 (Japanese Patent Publication No. 2562/1972), U.S. Pat. No. 3,395,603 (Japanese Patent Publication No. 13139/1973), U.S. Pat. Nos. 3,738,043, 3,861,269, etc. Many of these proposals have been variously improved and found wide application in the art especially for specific uses.

However some of the screws heretofore proposed require a relatively uneconomical manufacturing method, while difficulties are encountered in the manufacture of screws of the type described since they are small-sized. Additionally there are limitations on the thickness of articles for which such screws are used. For example, these screws are usable for iron plates as thin as up to about 3 mm, because the cutting edge could break if used for larger thicknesses.

Self-drilling screws further involve some difficulty in the removal of the chips resulting from the cutting operation.

SUMMARY OF THE INVENTION

An important object of this invention is to provide a drill structure which has a drill portion of flat or platelike cross section and which is thereby adapted for a highly efficient self-drilling operation and rendered amenable to economical quantity production.

Another important object of this invention is to provide a drill structure including a drill portion which, although having a flat or platelike cross section so as to be usable for self-drilling with a greatly improved efficiency, is capable of drilling hard parts of considerably increased thickness free of break or damage during the operation, by virtue of the provision of ribs formed on the opposite long side faces of the thin drill portion and extending longitudinally of the shank portion thereof.

Another important object of this invention is to provide a drill structure having ribs protruding from the opposite long sides of its thin drill portion so as to form a curved face on each of the long sides and to thereby render chips smoothly removable.

Still another object of this invention is to provide a novel drill structure by which workpieces can be drilled and then tapped and fastened efficiently and which can be manufactured with ease and with high strength.

Other objects, features and advantages of the present invention will become apparent from the following detailed description given with reference to the accompanying drawings.

BRIEF DESCRIPTION OF THE DRAWINGS

FIG. 2 is a bottom plan view showing the screw of FIG. 1;

FIG. 3 is a view in section taken along the line 3—3 in FIG. 1 and showing a drill portion in detail;

FIG. 5 (1) to (4) are sectional views showing how to use the screw of the invention.

DESCRIPTION OF THE PREFERRED EMBODIMENTS

Figure 1:
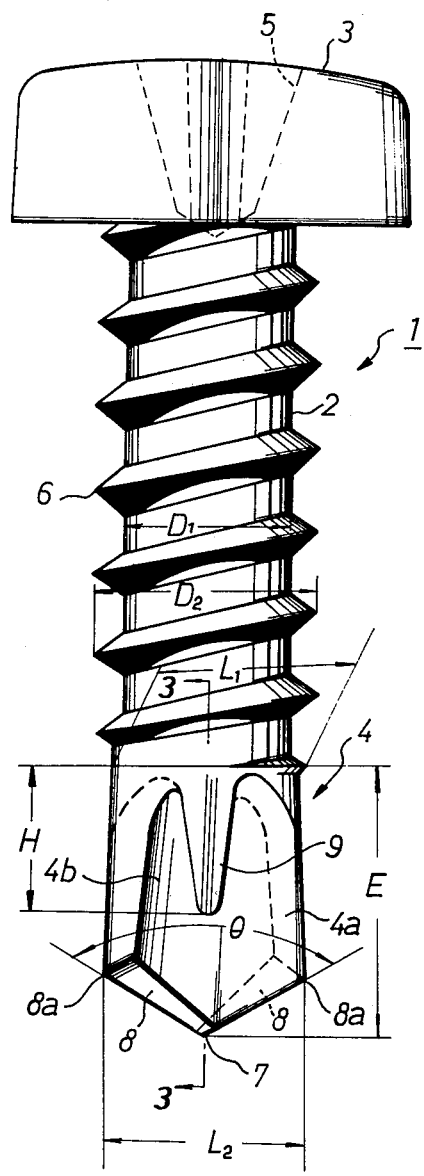
FIG. 1 is a front view showing a screw of this invention in detail.

FIG. 1 shows a screw 1 of this invention in its entirety. The screw 1 comprises a slender shank 2, tool receiving means 3 integral with the rear end of the shank 2 and a drill portion 4 integral with the front end of the shank 2.

The tool receiving means 3, although shown in the form of a round head having a screwdriver engaging recess 5, can be designed as a dish-shaped head, hexagonal head or socket. The engaging recess 5 can be in the form of a slot, cross slot or the like in conformity with the tool to be used as already known.

The shank 2 is circular in cross section and is provided with a cutting screw thread 6 extending helically on the shank 2 and having a major diameter and a minor diameter as specified. The screw thread 6 has a predetermined lead angle as shown in FIG. 1 and is in the form of as triangular projection as seen in FIG. 3.

The thread 6 has a starting end at the base portion of the drill portion 4 and extends helically around the shank 2. The shank 2 has a single thread as illustrated or may have a double thread (not shown).

The drill portion 4 is predominantly flat or platelike in cross section and has long sides L and short sides 1L as seen in FIG. 2. The long side portion L has a progressively increasing long side length toward the tip of the drill portion 4. The minimum long side length $L_i$ shown in FIG. 1 is slightly larger than the diameter $D_l$ of the shank 2 and smaller than the major diameter $D_2$ of the thread 6. The maximum long side length $L_2$ is smaller than the major diameter $D_2$ of the thread 6 but is larger than the shank diameter $D_1$. With the length $L_1$ progressively increasing to the length $L_2$, the drill portion 4 generally resembles part of a cone.

The drill portion 4 extending from the shank 2 has a length E with its tip 7 positioned on the axis of the shank 2. As shown in FIG. 2, the tip 7 is in the form of an edge obliquely transversing the platelike drill portion 4. The top end of the drill portion 4 is tapered to the tip 7 to provide cutting faces 8 at an angle of $\theta$ with respect to each other. The angle $\theta$ is for example 110 degrees.

The cutting face 8 is a slanting face extending obliquely of the drill portion 4 and has a progressively increasing width radially outward of the drill portion as seen in FIG. 2. In other words, the short side 1L has a progressively increasing length. Each of the cutting faces 8 has an edge 8a serving substantially as a cutting edge. The drill portion 4 has a pair of long side faces 4a each including a planar part and a gently curved part 4b extending along the edge thereof. Thus the drill portion has a progressively increasing width radially outward thereof, namely an increasing short side length 1L.

The part 4b is curved not only radially of the drill portion but also longitudinally of the shank as it extends from the drill base portion to the top end of the drill portion, where the long side face 4a is planar and includes the gently curved part 4b continuous with the planar part. The curved part 4b serves as a guide for removing chips (see FIG. 3).

A pair of ribs 9 formed on the long side faces 4a of the drill portion 4 are semicircular in cross section and extend longitudinally of the shank 2. Each of the ribs 9 is positioned in the middle of the length of the long side as seen in FIG. 2 and has about one half the length E of the drill portion 4 as indicated at H in FIG. 1. Because the rib 9 has a progressively decreasing width toward the top end of the drill portion as shown in FIG. 1 and because it is formed on the long side face 4a as a protrusion, it is inclined as illustrated in FIG. 3.

Figure 4:
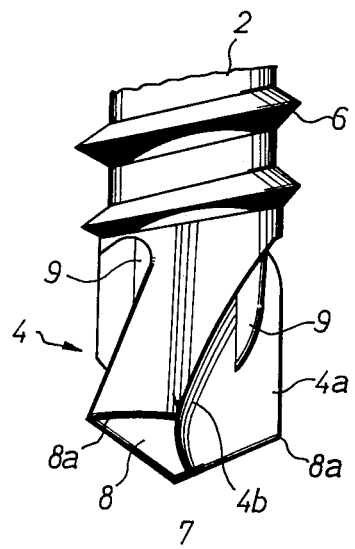
FIG. 4 is a view showing another preferred embodiment of the invention including a circumferentially twisted drill portion as it is seen from one side.

FIG. 4 shows a preferred modification of the screw 1 of this invention which is formed by twisting the drill portion 4 circumferentially thereof to a specified extent, whereby the guide parts 4b are given a rake angle. Thus this screw has an improved cutting ability over the screw shown in FIGS. 1 to 3. The modification has the same construction as the first embodiment except that the drill portion 4 has been twisted as above, so that throughout FIGS. 1 to 4, like parts are referred to by like reference numerals.

The screw 1 of this invention is made by forming the shank, drill corresponding portion of reduced diameter and head integrally from a material by press work, then press-forming the drill portion 4 and finally forming the thread 6 by rolling. At this time, the ribs 9 are useful in press-forming the drill portion 4 by a pinch pointer free of objectionable deformation.

The screw 1 of this invention will be used for example in the manner to be described below with reference to FIGS. 5 (1) to (4), which show a base wood member A and a covering member B of metal plate having a suitable thickness. The thickness of the covering member B is dependent on the size of the screw 1.

The screw 1 is fitted for example to an unillustrated pneumatic tool by the tool receiving means 3, and then placed on the covering member B at right angles thereto with the tip 7 of the drill portion 4 pressed against the member B. The screw 1 is driven by the tool about its axis in the specified direction, i.e. in a counterclockwise direction in FIG. 2, causing the edges 8a of the pair of the tapered cutting faces 8 to progressively cut the covering member B.

The drilling operation by the edges 8a forms a bore of diameter smaller than the major diameter of the thread 6. The flat or platelike drill portion 4 enables the pair of edges on the long side faces 4a to perform the cutting operation, which proceeds gradually since the tapered cutting faces 8 obliquely extend on the drill portion 4. The chips formed by the cutting operation are guided by the curved parts of the long side faces 4a radially outward of the drill portion while smoothly escaping longitudinally of the shank in a direction opposite to the screw advancing direction.

During the cutting operation, the drill portion 4 will encounter a considerably high cutting resistance which would act to break the flat drill portion transversely thereof, whereas the presence of the ribs 9 and the increased thickness of the drill portion provided by the curved guide faces 4b conjointly serve to preclude the possible breakage, if any.

The ribs 9, although protruding, will not substantially affect the removal of chips since they are shorter than the drill portion 4.

After the drill portion 4 has completely drilled the covering member B as shown in FIG. 5 (2), the screw 1, which is continuously driven by the tool, further cuts the base member A with its drill portion while cutting the covering member B with the thread 6 on its shank 2 as illustrated in FIG. 5 (3). The fastening and screwing operation is finally completed upon the seat face of the tool receiving means 3 coming into pressing contact with the covering member B as shown in FIG. 5 (4).

Thus the screw structure of this invention described in detail above advantageously fulfils the contemplated objects.

Although the preferred embodiments of this invention have been described above with reference to the drawings, the invention can be modified variously without departing from the spirit and scope thereof defined in the appended claims.

What is claimed is:

1. A drilling and tapping screw structure comprising:
    a slender shank;
    cutting screw thread means extending helically on an outer periphery of said shank;
    tool receiving means formed at a rear end of said shank;
    a drill portion integral with a front end of said shank, said drill portion having a cross-section comprising a central portion and two integral protrusions wherein said protrusions extend from opposite sides on opposite ends of said central portion, said cross-section defined by short side portions and long side portions, wherein each of said long side portions is comprised of a planar portion and a gently curved guide portion which forms said protrusions, said drill portion extending from said shank in a substantially truncated shape form with said long side portions having a base portion, said base portion having a diameter slightly larger than a diameter of said shank and slightly smaller than a diameter of said shank including said cutting screw thread means, said base portion diameter progressively increasing in a direction away from said rear end of said shank to a maximum diameter slightly smaller than said diameter of said shank including cutting screw thread means;
    a tip positioned on an axis of said shank on said drill portion, said tip being comprised of a pair of tapered cutting faces, wherin said faces form a sharp edge and are symmetrically positioned with respect to an outermost point of said tip, with each of said faces having a width which progressively increases in a direction away from said outermost point; and
    a pair of ribs respectively formed centrally on said long side portions, said ribs extending longitudinally from said front end of said shank, said ribs narrowing in a direction away from said shank and having a peripheral surface and length about one-half the axial length of said drill portion.

2. A drilling and tapping screw as in claim 1 wherein said drill portion has a circumferentially twisted shape.

3. A drilling and tapping screw as in any of claims 1 or 2 wherein said gently curved guide portions of said drill portion are curved longitudinally of said shank.

* * * * *